United States Patent [19]

Dennis

[11] Patent Number: 4,559,623

[45] Date of Patent: Dec. 17, 1985

[54] 45 RPM AUTOMATIC PLAY ADAPTOR

[75] Inventor: James T. Dennis, 2312 NW. 57th St., Oklahoma City, Okla. 73112

[73] Assignee: James T. Dennis, Oklahoma City, Okla.

[21] Appl. No.: 611,528

[22] Filed: May 17, 1984

[51] Int. Cl.⁴ .................................................. G11B 17/18
[52] U.S. Cl. ......................................................... 369/207
[58] Field of Search ...................................... 369/207, 210

[56] References Cited

U.S. PATENT DOCUMENTS

| | | | |
|---|---|---|---|
| 3,273,895 | 9/1966 | Simpson | 369/207 |
| 3,515,392 | 6/1970 | Kitahara | 369/207 |
| 3,799,557 | 3/1974 | Clark | 369/207 |
| 3,814,440 | 6/1974 | Aisumi | 369/207 |
| 3,869,130 | 3/1975 | Igata | 369/207 |
| 3,905,604 | 9/1975 | Dennis | 369/207 |
| 4,376,305 | 3/1983 | Dennis et al. | 369/210 |

Primary Examiner—Steven L. Stephan
Attorney, Agent, or Firm—Mason, Kolehmainen, Rathburn & Wyss

[57] ABSTRACT

A 45 rpm record adaptor body is positioned at the center of the turntable and has a record supporting shelf on one side and a shoulder opposite said shelf. The distance from the inner edge of said shelf to the bottom of said shoulder is slightly greater than the hole diameter of a 45 rpm record so that one side of a stack of 45 rpm records placed on said body is supported on said shelf and the other side of the stack is supported on said shoulder. The shelf is undercut to a point at which the distance to the bottom of said shoulder is less than the hole diameter of a 45 rpm record to permit an ejected record to move off of said shoulder and onto the turntable.

24 Claims, 13 Drawing Figures

45 RPM AUTOMATIC PLAY ADAPTOR

The present invention relates generally to record changers, and, more particularly, to an arrangement for supporting a stack of large hole 45 RPM records above the turntable of an automatic record changer and successively releasing the bottom record of the stack onto the turntable during successive record changing cycles.

In the past various types of adaptors have been employed to permit the playing of large-hole 45 RPM records on a conventional record changer. In one type of adaptor the record stack is supported on only one side of the centering aperture of the records. These adaptors have required a balance arm or holddown arm pivotally mounted at a point beyond the turntable which must be swung inwardly and moved downwardly against the top record after the records have been placed on the adaptor to hold the record stack horizontal while the bottom record is released. In some instances a weighted disc is substituted for the balance arm. Examples of this type of 45 RPM adaptor are shown in Krahulec U.S. Pat. No. 3,191,941, Reed U.S. Pat. No. 3,191,943, Simpson U.S. Pat. No. 3,301,563, Van Antwerp U.S. Pat. No. 3,414,270, Kelly U.S. Pat. No. 3,506,274, Dennis U.S. Pat. No. 3,689,080, Sostero U.S. Pat. No. 3,827,698, and Dennis U.S. Pat. No. 3,905,604.

In Simpson U.S. Pat. No. 3,301,563 an adaptor spindle for 45 RPM records is disclosed in which a stack of records may be supported on the adaptor spindle without using a balance arm to hold the record stack horizontally. One edge of the record stack is supported on a shelf provided in the adaptor body and the other edge of the record stack is supported on a movable member which moves inwardly into the adaptor body as the bottom record is released. Such an arrangement has the disadvantage that the support of the record stack on a movable member does not provide an accurate location for the record stack because of tolerance variations in the different parts of the adaptor. In some instances difficulties may be experienced due to the fact that the movable members are not always in the same location. Also, in the arrangement of the Simpson U.S. Pat. No. 3,301,563 it is necessary to remove the adaptor spindle from the conventional centering spindle to permit removal of records from the turntable after they have been played.

Another type of 45 RPM record adaptor has been employed wherein a cylindrical housing member houses a pair of movable, oppositely disposed, record support or shelf members and a pair of movable, oppositely disposed record separator blades, the blades being positioned above the shelves for extension into the space between the lowermost and the next to lowermost records in the stack of records supported on the movable shelf members. Various types of actuating mechanisms are provided for retracting the shelves and extending the separator blades so as to permit the lowermost record to drop onto the turntable. Such prior art arrangements also do not require the use of a balance arm but suffer from the above mentioned disadvantages of Simpson and require relatively complex actuating mechanisms for controlling the synchronized movement of the shelf and blade members.

It is, therefore, an object of the present invention to provide a new and improved 45 RPM record adaptor which avoids one or more of the above mentioned disadvantages of the prior art arrangements.

It is a further object of the present invention to provide a new and improved 45 RPM record adaptor wherein the record stack is seated on fixed portions of the adaptor body itself which are spaced apart so as to provide accurate location and positioning for the record stack without requiring the use of a balance arm.

It is another object of the present invention to provide a new and improved 45 RPM record adaptor wherein a stack of 45 RPM records may be easily deposited on fixed support areas of the adaptor body and after the stack of records has been played the records can be removed from the turntable by simply lifting them off of the adaptor without removing the adaptor from its support.

It is a further object of the present invention to provide a new and improved 45 RPM record adaptor in which record supporting shelf means are provided on the adaptor body and upwardly and inwardly extending inclined shoulder means are provided opposite the shelf, the distance from the inner edge of the shelf to the bottom of the inclined shoulder being slightly greater than the hole diameter of a 45 RPM record so that one side of the record stack is supported on the shelf means and the other side of the record stack is supported on the inclined shoulder means at a point above the bottom thereof.

It is another object of the present invention to provide such a 45 RPM record adaptor in which the shelf is undercut to a point at which the distance to the bottom of the inclined shoulder means is less than the hole diameter of a 45 RPM record, thereby to permit the bottom record ejected from the shelf to move off of said inclined shoulder and onto the turntable.

It is a further object of the present invention to provide a new and improved 45 RPM record adaptor wherein the record stack is supported on fixed, spaced apart support portions of the adaptor body and record ejector means are mounted in the adaptor body and arranged to engage the edge of the bottom record and move it off an adaptor shelf provided in the adaptor body, said record ejector means being also capable of movement in response to a relatively light force so that the presence or absence of a record on said shelf can be detected.

It is a further object of the present invention to provide a new and improved 45 RPM record adaptor wherein a stack of records placed on an adaptor body are supported on one side on an adaptor shelf formed in the body and on the other side on an inclined shoulder at a point above the bottom of said inclined shoulder, the bottom record of the stack being moved upwardly along said inclined shoulder as the bottom record is moved off of said shelf by record ejector means.

Briefly, the above and other objects of the present invention are achieved by providing a molded one-piece adaptor of generally rectangular cross section. A pair of projecting, record supporting shelves are formed in the forward corners of the adaptor body and the rear corners of the adaptor body include a pair of upwardly and inwardly inclined edges which form shoulder means for supporting the other side of the record stack. The distance from the inner edge of the record supporting shelves to the bottom of the inclined shoulder at the rear of the adaptor is slightly greater than the hole diameter of a 45 RPM record so that when a stack of records is placed on the adaptor body one side of the record stack is supported on the corner shelves and the other side of the stack is supported on the inclined shoulder edges at the rear of the adaptor body. A record ejecting member is slidably mounted in the adaptor body for movement in a horizontal plane and a vertically extending blade member which is pivotally mounted in the adaptor body is interconnected at the upper end thereof with the record ejector member so that pivotal movement of the blade produces outward movement of the record ejector member so as to move the bottom record of the stack off of the shelves. As this movement occurs the back edge of the record stack moves upwardly along the inclined shoulders until the bottom record is moved off of the shelves. However, the record shelves are undercut so that as soon as the bottom record drops off of the forward edge of the shelves it can move rearwardly and slide down the inclined shoulders at the rear of the adaptor body. The shelves are undercut to a point at which the distance to the bottom of the inclined shoulder is less than the hole diameter of a 45 RPM record, thereby permitting the bottom record to move off of the inclined shoulder and down the adaptor body onto the turntable.

The invention, both as to its organization and method of operation, together with further objects and advantages thereof, will best be understood reference to the following specification taken in connection with the accompanying drawings in which.

Referring now to the drawings, and more particularly to the embodiment shown in FIGS. 1-10 thereof, the 45 RPM record adaptor of the present invention, which is indicated generally at 20, comprises a one-piece molded adaptor body 22, a record ejector member 24 which is slidably mounted for movement in a horizontal plane in the adaptor body 22 and a vertically extending blade 26 which is interconnected at its upper end with the record ejector member 24. In the embodiment of FIGS. 1-10, inclusive the adaptor 20 is arranged to be substituted for the conventional centering spindle for small hole records of an automatic record changer. Accordingly, the adaptor body 22 includes a downwardly extending stem portion 28 which is arranged to fit within the socket which normally holds the small hole centering spindle, the stem 28 being provided with a projection 30 which engages an opening in the socket to retain the adaptor 20 in the desired position at the center of the turntable. It will thus be understood that the conventional small hole centering spindle is removed from the record changer and the adaptor 20 substituted therefore by inserting the stem portion 28 into the centering spindle socket of the changer in the embodiment of FIGS. 1-10, inclusive.

The adaptor body 22 is provided with a top wall 32, a front wall 34, a bottom wall 36 and a pair of sidewalls 38 and 40 which extend between top wall 32 and bottom wall 36, the backside of the adaptor body 22 being open so as to permit the adaptor body 22 to be molded in one piece in a single molding operation.

In order to slidably mount the record ejector member 24 in the body 22, upper and lower ledges 42 and 44 are formed in each of sidewalls 38, 40 and extend inwardly to provide a mounting for the record ejector member 24. Also, in order to provide additional stability for the sidewalls 38, 40, since no rear wall of the adaptor body is provided, an intermediate partition 46 is provided between the top wall 32 and bottom wall 36 and is provided with a pair of rearwardly extending V-shaped portions 48 and 50 (FIG. 10) which provide clearance for the blade 26 and yet provide additional rigidity in the middle of the sidewalls 38, 40. Preferably, the top surface 52 of the ledges 42, the bottom surface 54 of the ledges 44, both surfaces 56 and 58 of the partition 46 and the upper surface 60 of the bottom wall 36 are all provided with draft tapers so as to permit the adaptor body 22 to be removed from a mold member which is inserted from the rear of the body 22.

Figure 1:
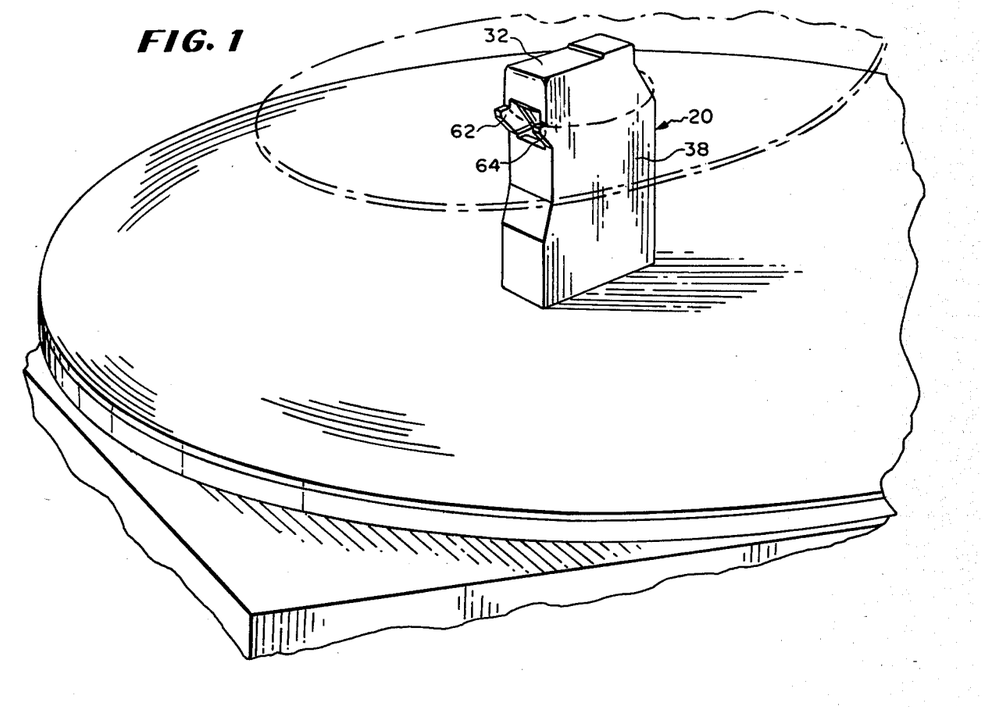
FIG. 1 is a perspective view of the 45 RPM adaptor of the present invention shown positioned at the center of the turntable and with a 45 RPM record supported thereon.
Figure 2:
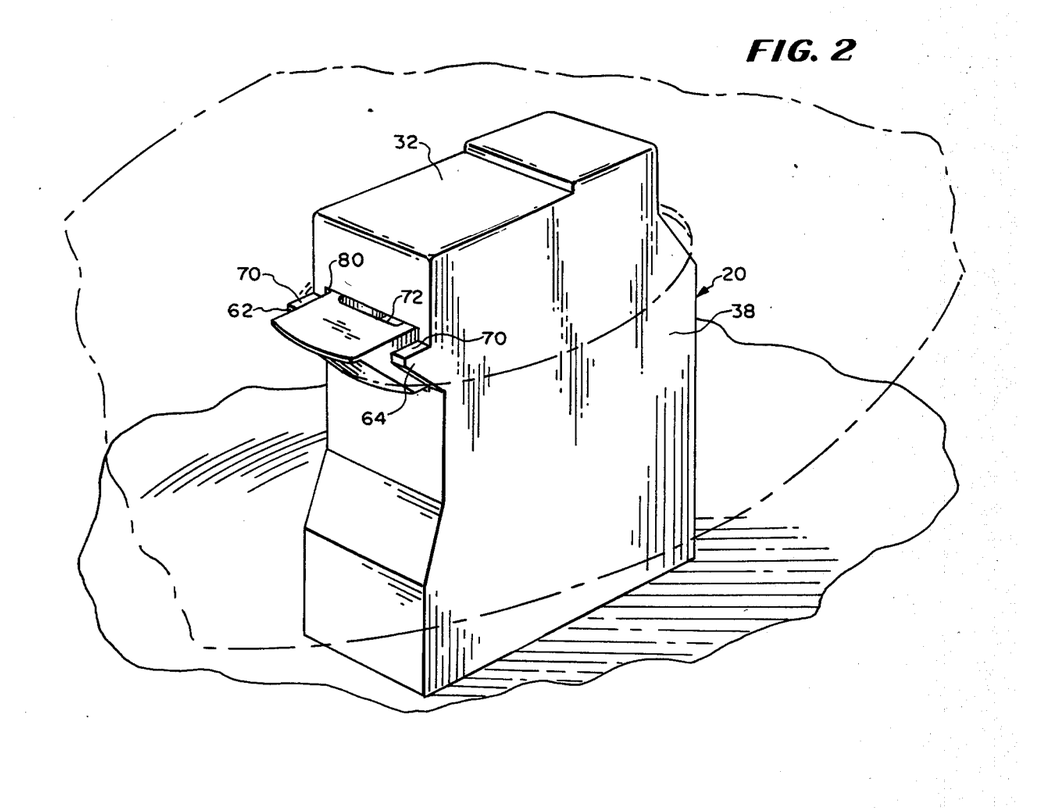
FIG. 2 is a perspective view on a somewhat larger scale than FIG. 1 showing the operation of the adaptor in moving the record off of the supporting shelves of the adaptor.
Figures 3, 4:
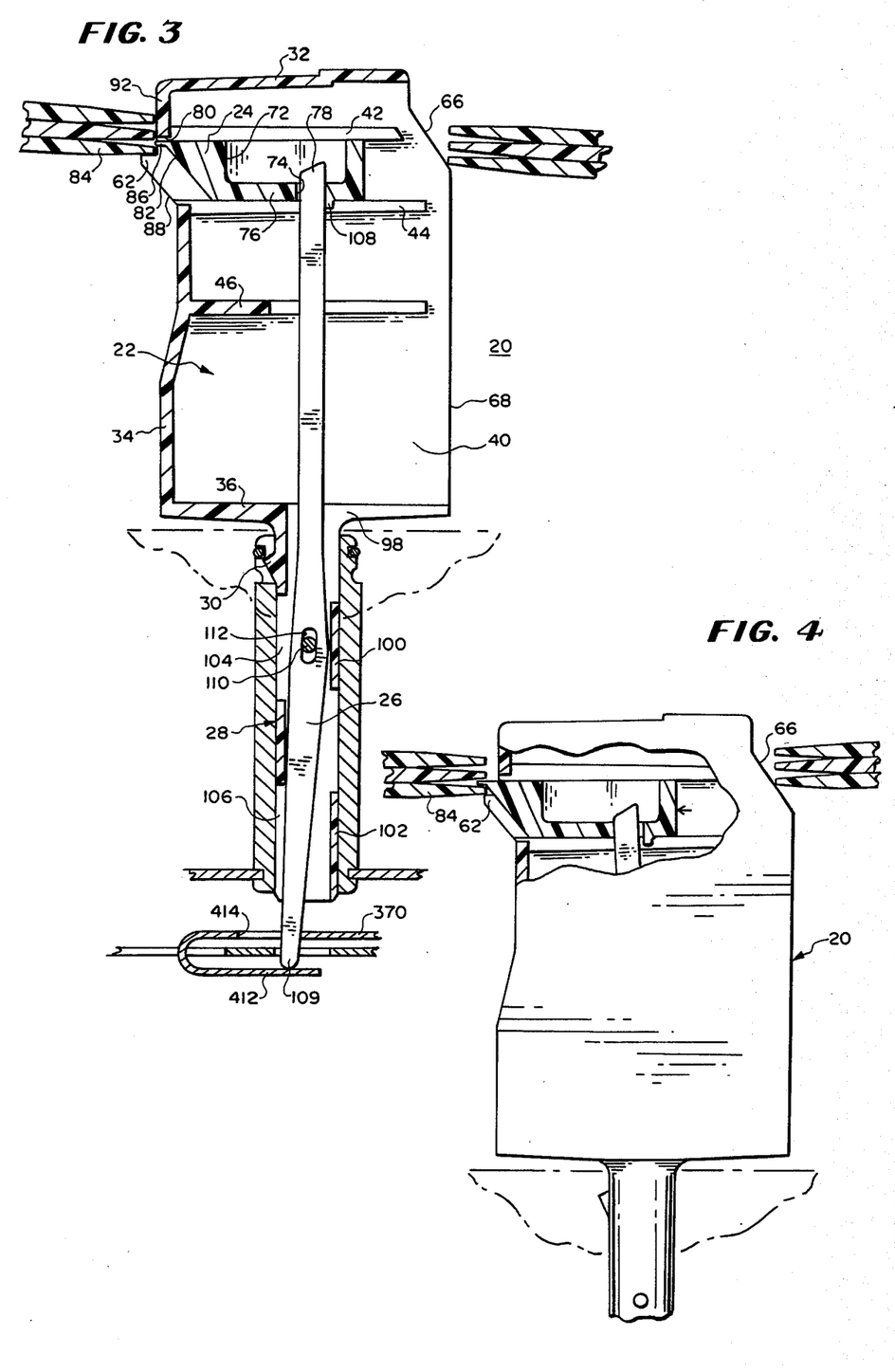
FIG. 3 is a side elevational view taken along the center line of the adaptor of FIG. 1 and showing a stack of 45 RPM records supported on the adaptor body.
FIG. 4 is a view similar to FIG. 3 and shows the condition in which the bottom record has been moved to the outer edge of the record supporting shelves on the adaptor body.

Considering now the manner in which a stack of 45 RPM records is supported on the adaptor body 22, a pair of record supporting ledges or shelves 62, 64 are formed in the body 22 as extensions of the sidewalls 38, 40 so as to form a pair of spaced apart record supporting members on which one side of a stack of 45 RPM records can be seated. The back edge of each of the sidewalls 38, 40 forms an inclined shoulder portion 66 which extends inwardly and upwardly from the lower vertical edge portion 68 of the sidewalls 38, 40 at an angle of approximately 30° to the vertical, the bottom of the inclined shoulders 66 being located somewhat lower than the upper record supporting surfaces 70 of the shelves 62, 64. As best illustrated in FIG. 3, the bottom edge of the shoulders 66 is spaced from the inner edge of the record supporting shelves 62, 64 by a distance slightly greater than the hole diameter of a 45 RPM record so that the backside of the record stack is supported on the inclined shoulders 66 at a point slightly above the point at which the inclined shoulder 66 joins the vertical edge portion 68, i.e. the bottom of the inclined shoulder portion 66. Accordingly, a stack of 45

RPM records may be loaded onto the adaptor 20 by simply placing these records over the upper end of the body 22 so that the bottom record is supported on the shelves 62, 64 at one side of the record stack and the other side of the record stack is supported on the inclined shoulders 66 in the position shown in FIG. 3.

The record ejecting member 24 is slidably positioned between the ledges 42, 44 formed in the sidewalls 38, 40 and is provided with a central recess 72. An opening 74 in the bottom wall 76 of the record ejector member 24 is provided through which the upper end portion 78 of the blade 26 extends, this upper end portion 76 being preferably tapered as shown in FIG. 3, to facilitate insertion of the blade 26 into the opening 74 as will be described in more detail hereinafter.

The forward end of the record ejector member is arranged to extend through an opening 80 in the front wall 34 of the adaptor body 22 and is provided with an undercut front edge portion 82 which is adapted to engage the inner edge of the bottom record 84 of the record stack seated on the shelves 62, 64 and move this edge portion of the record 84 off of the front end of the shelves 62, 64. During this movement the back edge of the entire stack of 45 RPM records rides upwardly along the inclined shoulders 66. Accordingly, when the bottom record 84 has been moved to the outer edge of the shelves 62, 64 the entire record stack has been moved upwardly along the inclined shoulder 66 to a point at which the record stack is almost horizontal, as shown in FIG. 4. The undercut front edge portion 82 of the record ejector member 24 is provided with a thin, projecting lip portion 86 at the upper edge of the undercut portion 82 which is positioned to be inserted between the bottom record 84 and the next record in the stack when the undercut portion 82 is moved into engagement with the inner edge of the bottom record, also as shown in FIG. 4.

As soon as the bottom record 84 is moved off of the front edge of the record shelves 62, 64 it starts to fall downwardly. In accordance with an important aspect of the invention the fixed record shelves 62, 64 are formed with the undercut portions 88 which extend inwardly and downwardly to a point inside of the inner edge of the record supporting surfaces 70 of the shelves 62, 64 to a position at which the distance from the undercut edge 88 to the bottom edge of the inclined shoulders 66 is less than the hole diameter of a 45 RPM record. Accordingly, after the bottom record 84 has been moved off of the shelves 62, 64, it slides down the inclined shoulder 66 to the position shown in dotted lines at FIG. 5 at which it clears the bottom edge of the inclined shoulders 66 so that it is free to fall onto the turntable. The undercut edge portions 88 of the shoulders 62, 64 connect to a recessed vertically extending wall portion 90 of the front wall 34 of the adaptor which is spaced inwardly from the upper portion 92 of the front wall of the adaptor above the record supporting ledges 70 to permit movement of the bottom record around the bottom edge of the inclined shoulder 66. Since the wall portion 90 is recessed inwardly by an amount sufficient to permit the bottom record to be moved off of the inclined shoulders 66, an intermediate front wall portion 94 is provided which is inclined outwardly and downwardly so that when the record engages the outer edge 96 (FIG. 8) of the front wall portion it is accurately centered on the turntable, the back edge 68 of the adaptor body 22 being spaced inwardly from the edge of a record on a turntable so that this record is centered only by engagement with the edge 96 of the front wall portion.

Figures 5, 6, 7:
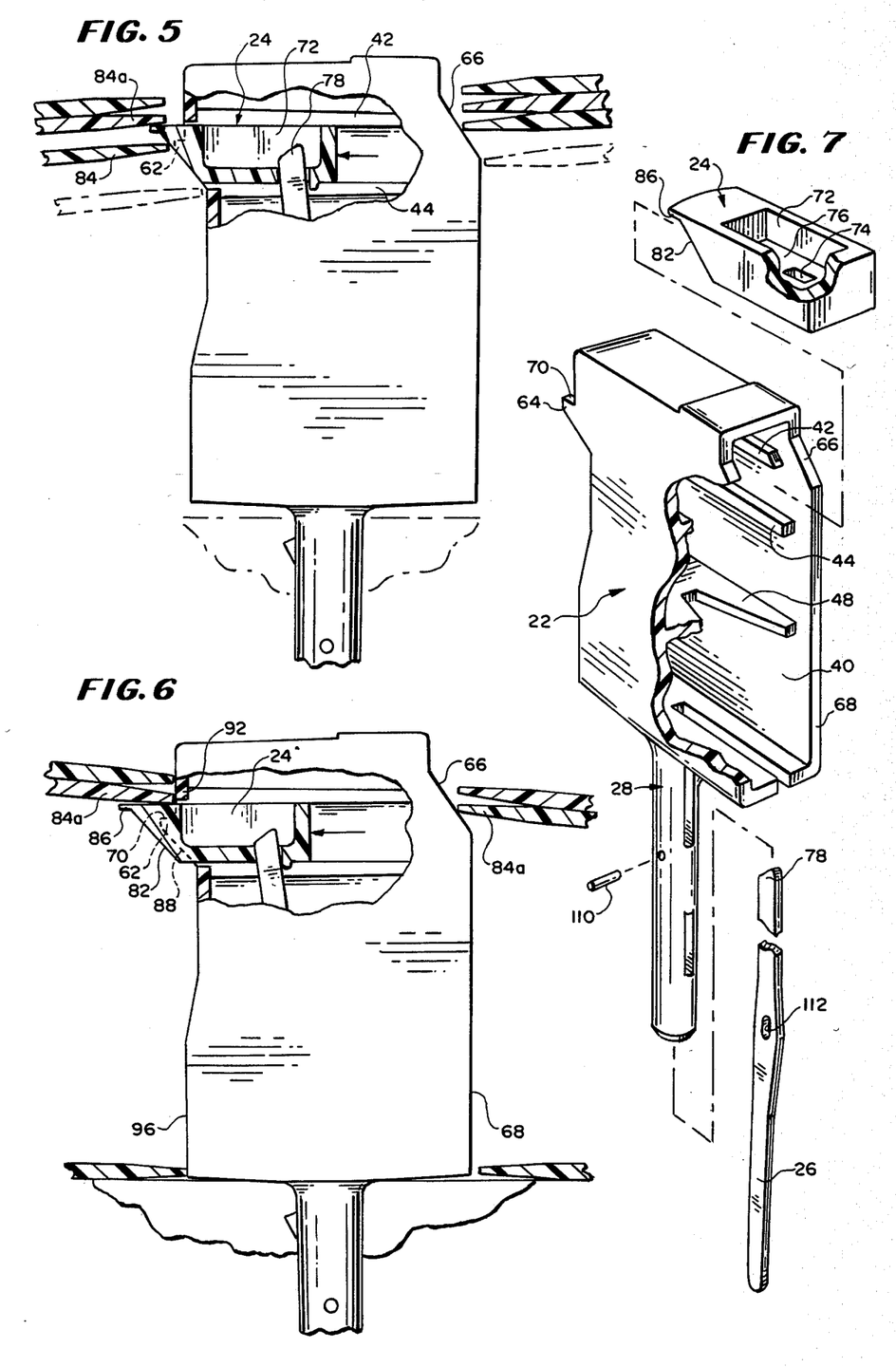
FIG. 5 is a view similar to FIG. 3 but shown in a later portion of the record changing cycle wherein the bottom record has been moved off of the record supporting shelves.
FIG. 6 is a view similar to FIG. 3 showing the operation of the adaptor in supporting the remaining records in the stack while the bottom record is deposited on the turntable.
FIG. 7 is an exploded perspective view of the component parts of the adaptor of the present invention.
Figure 8:
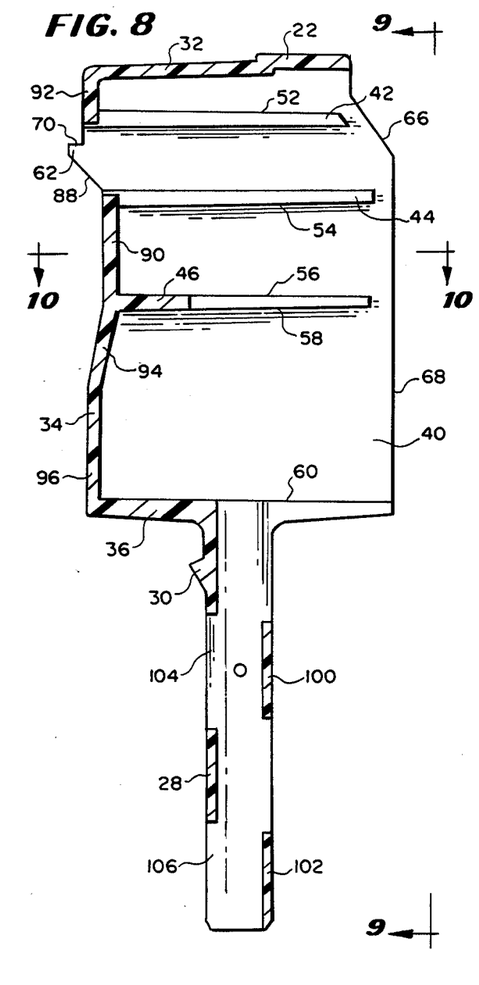
FIG. 8 is a side elevational cross sectional view of the adaptor body taken along the center line thereof.
Figure 9:
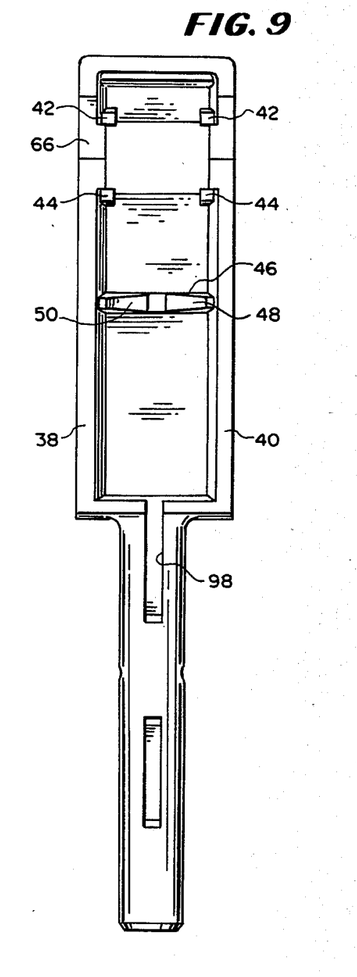
FIG. 9 is a right hand side elevational view of FIG. 8.
Figure 10:
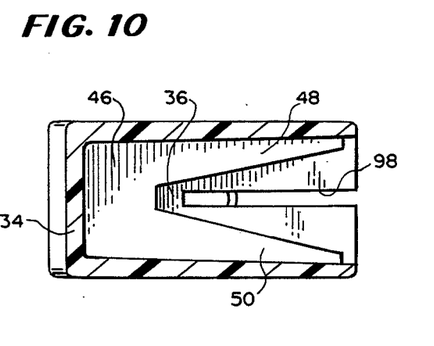
FIG. 10 is a sectional view taken along the lines 10—10 of FIG. 8.

As soon as the bottom record 84 is moved off of the surface 70 of the record supporting shelves 62, 64 the next record in the stack i.e. the record 84a in FIG. 5 is supported on the upper surface of the record ejector member 24. The record ejector member 24 continues to move outwardly from the position shown in FIG. 5 to the position shown in FIG. 6 to ensure that the bottom record 84 has been moved off of the shelves 62, 64. However, as soon as the bottom record 84 drops downwardly along the incline 66 the remaining records of the stack slide downwardly along the inclined shoulder 66 so that the opposite edges of the centering apertures of these records are moved inwardly against the upper wall portion 92, as shown in FIG. 6. In this position, the back edge of the bottom record 84a of the remaining stack is positioned on the inclined shoulder 66 at a point considerably above the bottom edge of these shoulders due to the fact that the upper surface of the record ejector member 28 is positioned considerably above the record supporting surfaces 70 of the shelves. However, when the record ejector member 28 is retracted to the position shown in FIG. 3 during the last half of the record changing cycle the records drop down onto the shelves 62, 64 to the position shown in FIG. 3 in which the bottom record is positioned just slightly above the bottom edge of the inclined shoulder 66. In this connection, it is pointed out that the steep incline of the shoulders 66 and the weight of the remaining records in the stack forces the bottom record sidewise against the inner edges of the shelves 62, 64 so that the bottom record is accurately positioned for engagement by the record ejector member 24.

Considering now the manner in which the component parts of the adaptor 20 are assembled, in order to mount the blade 26 in the adaptor body 22, a slot 98 is formed in the bottom wall 36 of the adaptor body 22 from the back edge of the adaptor to the front wall of the stem portion 28. The slot 98 could be formed all the way down the back side of the stem 28, as in the embodiment of FIG. 11. However, in the embodiment of FIGS. 1–10, inclusive, the reinforcing portions 100 and 102 are formed along the length of the stem 28 and in these areas the slots 104 and 106 are formed in the stem 28 from the opposite side of the stem by the other half of the mold in a one piece molding operation. In assembly, the record ejector member 24 is first inserted between the ledges 42, 44 with the forward edge 82 thereof adjacent the undercut edges 88 of the record supporting shelves 62, 64. The blade 26 is then inserted through the slot 98 until the upper end 78 of the blade 26 strikes the bottom wall 76 of the record ejector member 24. The blade 26 may then be pivoted rearwardly until it strikes a lip 108 (FIG. 3) formed in the bottom wall 76 of the record ejector member 24 at the back edge of the opening 74 therein. The blade is thus in position to be inserted through the opening 74 in the record ejector member 24 after which a pin 110 (FIG. 7) is inserted through the stem 28 and an elongated slot 112 in the blade 26 to retain the adaptor body, blade 26 and record ejector member 24 in cooperating relationship.

In accordance with an important aspect of the present invention, the 45 RPM adaptor is arranged so that the record ejector member 24 may be moved in response to an extremely light force exerted on the blade 26. Accordingly, movement of the record ejector member 24 may be employed to sense the presence or absence of a 45 RPM record on the record supporting shelf 62, 64 and the absence of a record on the shelves may be employed to turn the automatic record changer off in the manner described in detail in Dennis U.S. Pat. No. 4,376,305. While the shut off mechanism is described in detail in the above-identified patent, for the purpose of the present invention it may be stated that the automatic record changer is provided with a push off slide 370 which is provided with a U-shaped end portion which defines a tab portion 412 which is positioned below the main portion of the push off slide 370 and is immediately below an opening 414 in the slide 370 through which the lower end portion 109 of the blade 26 extends so that the end of the portion 109 rests on the tab 412. The blade 26 is mounted in the stem portion 28 so that the pin 110 is positioned midway of the slot 112 so that the end portion 109 rests on the tab 412 with only the weight of the blade 26 forcing these two members into engagement. During the record changing cycle the slide 370 is moved bodily to the right as viewed in FIG. 3. During the initial portion of the motion of the slide 370 the end portion 109 of the blade 26 is urged to the right with a very slight force due to the weight of the blade 26 which is sufficient to move the slidably mounted record ejecting member 24 outwardly toward the record supporting shelves 62, 64 until it engages the bottom record. However, if a record is present on the shelves 62, 64 the light force exerted on the blade 26 is insufficient to move the bottom record off of the shelves 62, 64. During the later portion of the record changing cycle, however, the bottom end 109 of the blade 26 is engaged by the back edge of the opening 414 and as the slide 370 continues to move a relatively large force is exerted on the bottom end of the blade 26 so that the record ejector member 24 is moved outwardly and ejects the bottom record from the shelves 62, 64 in the manner described in detail heretofore. If no record is present on the shelves 62, 64 the record ejector member 24 is not restrained and the relatively light force exerted on the blade 26 is effective to move the blade 26 to a last record shutoff position so that the record changer is turned off in the manner described in detail in U.S. Pat. No. 4,376,305.

Figures 11, 12, 13:
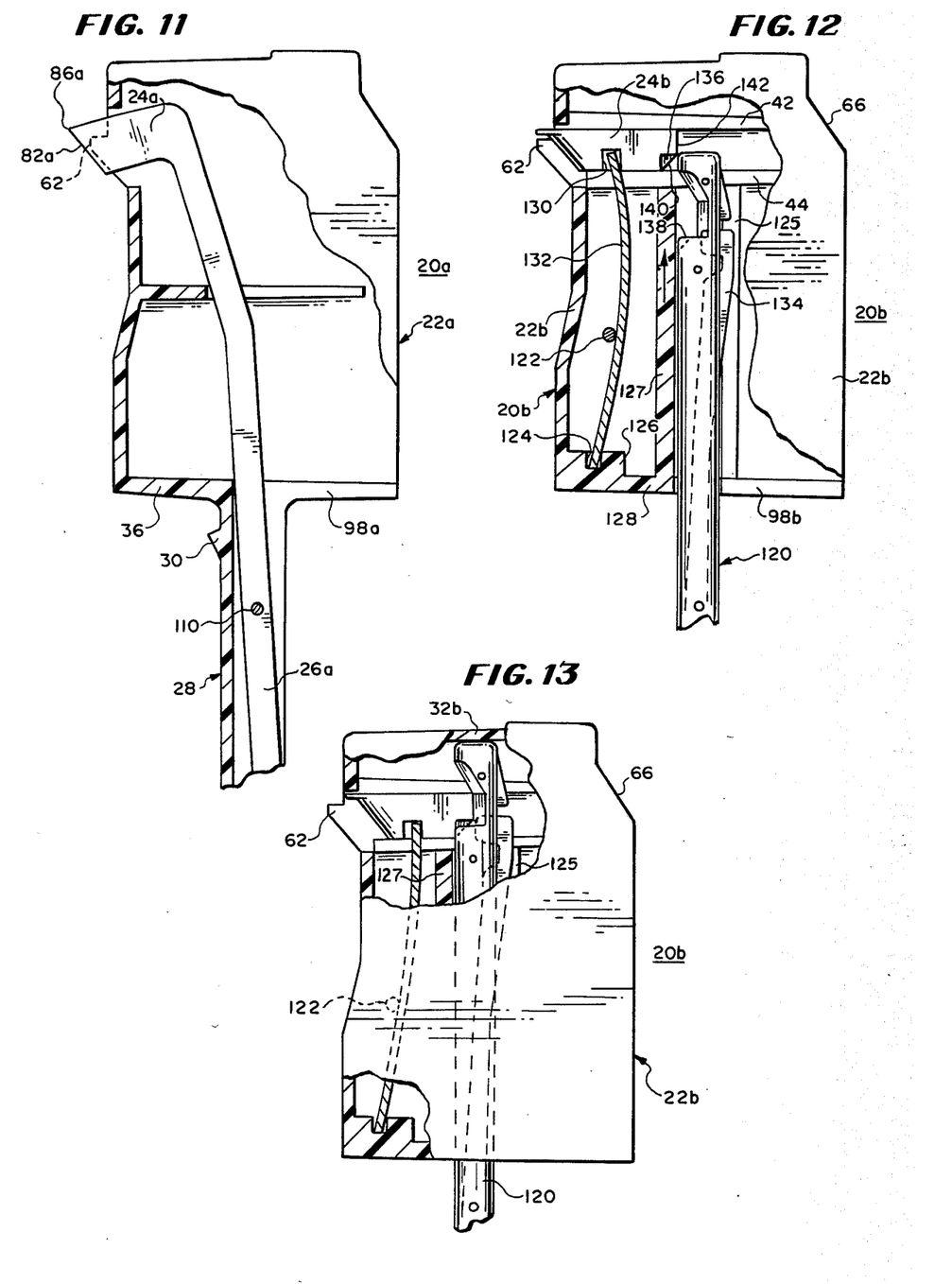
FIG. 11 is a side elevational view of an alternative embodiment of the present invention wherein a one piece record ejecting means is employed.
FIGS. 12 and 13 are cross sectional views of a further alternative embodiment of the invention wherein the adaptor body is arranged to be inserted over the conventional centering spindle of an automatic record changer.

Referring now to the alternative embodiment shown in FIG. 11, in this embodiment the 45 RPM adaptor 20a functions substantially identical to the adaptor 20 shown and described in detail heretofore in connection with FIGS. 1-10, inclusive. However, in the adaptor 20a the blade 26a which is pivotally mounted in the stem portion 28, is provided with an integral flat blade head portion 24a instead of being interconnected with a separate record ejector member 24 as in the embodiment of FIGS. 1-10. The front edge of the head portion 24a is provided with an undercut portion 82a which terminates in a forwardly projecting point 86a. The point 86a is first inserted between the bottom record and the next record in the stack and then the undercut portion 82a engages the bottom record on the shelves 62, 64 and moves the bottom record of the stack off of these shelves. The operation of the head portion 24a in ejecting a record and supporting the remainder of the record stack is substantially identical to the operation of the record ejector member 24 described in detail heretofore. In order to permit the assembly of the blade 26a into the body of the adaptor 20a the slot 98a which is formed in the bottom wall 36 and the stem portion 28 extends for the full length of the stem portion 28, the forward wall of the stem portion 28 being solid for a substantial portion of the stem is indicated in FIG. 11. The back opening slot 98a in the adaptor 20a permits the head portion 24a of the blade 26a to be inserted into the adaptor body after which the blade 26a is held in position by means of the pin 110. In the embodiment of FIG. 11 the record ejector blade 26a is also movable in response to an extremely light force so that it can be used to sense the presence or absence of a record in the shelf 62, 64 as described heretofore in the embodiment of FIGS. 1-10, inclusive. However, in the embodiment of FIG. 11 the blade 26a is not provided with a slot 112 as in FIG. 7 because the head portion 24a must be accurately located relative to the shelf 62, 64. Accordingly, the bottom end of the blade 26a engages the member 370 (FIG. 3) and a spring force is exerted upwardly on the number 370 to provide sufficient friction to move the blade 56a during the last record sensing portion of the record changing cycle as described in Dennis U.S. Pat. No. 4,376,305.

In FIGS. 12 and 13 an alternative embodiment of the invention is shown wherein the 45 RPM adaptor indicated generally at 20b may be placed over the conventional centering spindle 120 of an automatic record changer rather than being substituted for such a centering spindle as in the embodiments of FIGS. 1-10 and 11. Referring to FIGS. 12 and 13, the adaptor body 22b of the adaptor 20b is substantially identical to the adaptor body 22 described in detail heretofore in connection with FIGS. 1-10 except that the stem portion 28 of the adaptor body 22 is removed, a transversely extending post 122 is provided between the sidewalls of the adaptor 22b, a slot 124 is provided in a boss portion 126 formed in the bottom wall 128 of the adaptor body 22b, and vertical guide ribs 125 and 127 are provided on the adaptor body 22b. The adaptor body 22b in the embodiment of FIGS. 12 and 13 is preferably molded in two halves which can be secured together by any suitable means such as glueing, rivoting, or they may be snapped together. The rear guide rib 125 is formed in the two halves of the adaptor body 22b so as to form a slot extending upwardly from the slot 98b in the bottom wall 128. The front guide rib 127 may be formed in either half of the adaptor body 22. A record ejector member 24b is slidably mounted between the ledges 42, 44 formed in the sidewalls in the adaptor body 22b. The forward record ejecting portion of the ejector 24b is identical to the forward portion of the record ejector 24 described in detail heretofore in connection with FIGS. 1-10 inclusive.

In order to provide a biasing force which normally urges the record ejector member 24b to a retracted position, the member 24b is provided with a downwardly opening slot 130 and a spring blade biasing member 132 is positioned in the slot 130 and in the slot 124 in the boss portion 126, the blade 132 being biased by engagement with the post 122 so that the record ejector member is normally biased to a retracted position.

In order that the adaptor 20b may be inserted over the centering spindle 120 and positioned so that the record ejector member 24b can be actuated by the record ejector blade 134 of the conventional spindle 120, the rear bottom corner of the ejector member 24b is provided with a narrow web portion 136 which is adapted to fit into the slot formed in the record supporting shelf 138 of the conventional spindle 120, the web portion 136 being formed with a sloping edge 140. With such an arrangement, when the adaptor 20b is placed over the spindle 120 the upper end of the spindle 120 engages the mitered edge 140 and cams the record ejector member 24b forwardly against the force of the biasing spring 132 so that the adaptor may be inserted over the end of the spindle 120 until the top of the spindle 120 engages the top wall 32b of the adaptor 22b, as shown in FIG. 13. As the adaptor 20b is inserted over the centering spindle 120 the keeper and ejector blade 134 thereof are inserted through the slot formed between the two halves of the rib 125 to maintain the adaptor body 22b in alignment and prevent it from rotating relative to the centering spindle 120.

When the adaptor 20b is in the position shown in FIG. 13 the back edge 142 of the record ejector member 24b is arranged to be engaged by the record ejecting blade 134 of the spindle 120 so that the ejector member 24b is moved forwardly against the force of the spring 132 so as to eject the bottom record off of the shelves 62, 64. After the bottom record has been ejected from the shelf 62, 64 it moves down the inclined shoulder 66 in the manner described in detail heretofore in connection with the embodiment of FIGS. 1–10, inclusive, and is deposited on the turntable. When the record ejector blade 134 of the conventional spindle 120 is returned to its rest position shown in FIG. 12, the spring 132 retracts the record ejector member 24b to a position inside of the adaptor body 22b, as shown in FIG. 13 so that the record stack may be supported on the shelves 62 and 64 and the inclined shoulders 66. Movement of the blade 134 may also be used to sense the presence or absence of a 45 rpm record on the shelf 62, 64, as described heretofore and in Dennis U.S. Pat. No. 4,376,305. If desired, the rib 125 may extend upwardly to the top wall 32b of the adaptor body 22b so that the keeper of the centering spindle 120 will also be positioned in the slot between the two halves of the rib 125 and prevent the adaptor body 22b from rotating with respect to the centering spindle 120, as described in Dennis U.S. Pat. No. 4,376,305.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In an automatic record changer having a rotatable turntable for supporting the records to be played, the combination of, a support body adapted to be positioned concentric with said turntable for supporting a stack of large hole 45 rpm records, means defining a fixed record supporting shelf on said body and integral therewith, means integral with said body diametrically opposite said shelf defining a shoulder having an upwardly and inwardly inclined portion, the distance from the inner edge of said shelf to the outer edge of said shoulder being slightly greater than the hole diameter of a 45 rpm record so that one side of a stack of 45 rpm records placed on said body is supported on said shelf and the other side of the stack is supported on said shoulder, and record ejector means for engaging said one side of the bottom record of the stack and moving it off of said shelf while the other side of the bottom record moves upwardly along said inclined portion of said shoulder to a point at which the distance to the outer edge of said shelf is less than the hole diameter of a 45 rpm record, said shelf being undercut to a point at which the distance to the outer edge of said shoulder is less than the hole diameter of a 45 rpm record, thereby to permit the bottom record ejected from said shelf to move off of said shoulder and onto said turntable.

2. The combination of claim 1, wherein said inclined portion of said shoulder extends at an angle of approximately 30° to the vertical.

3. The combination of claim 1, wherein said shelf is undercut to a point radially inside the inner edge of said shelf.

4. The combination of claim 1, wherein said adaptor body is of generally rectangular cross section and said record supporting shelf comprises a pair of outwardly extending ledges positioned at two adjacent corners of said rectangular adaptor body and integral therewith.

5. The combination of claim 4, wherein said shoulder is formed in the other two adjacent corners of said generally rectangular adaptor body.

6. The combination of claim 1, wherein said shoulder extends radially inward by an amount sufficient to permit the entire stack of records to move upwardly along an inclined portion of said shoulder as the bottom record is moved off of said shelf by said record ejector means.

7. The combination of claim 1, wherein said record ejector means includes a member slidably mounted in said adaptor body for movement in a horizontal plane, the outer end of said member being adapted to engage the bottom record of a stack of 45 rpm records seated on said shelf and move the same off of said shelf.

8. The combination of claim 7, wherein the outer end of said member is also undercut to facilitate movement of the bottom record off of said shelf.

9. The combination of claim 7, wherein said outer end of said member is inserted between the bottom record and the next record in the stack as the bottom record is moved off of said shelf, said outer end of said member and said shoulder providing the sole support for the records remaining in the stack as the bottom record is deposited on the turntable.

10. The combination of claim 9, wherein said record ejector means includes means for moving said member inwardly after the bottom record is deposited on the turntable so that support for said one side of the remaining record stack is transferred from said member to said shelf, said inclined portion of said shoulder being sufficiently steep that the record stack is moved laterally during said transfer so that the bottom record thereof is precisely positioned against the inner edge of said shelf.

11. The combination of claim 7, wherein said outer end of said member is provided with an outwardly extending lip portion formed in the upper edge of said outer end portion and adapted to be inserted between the bottom record and the next record in the stack as the bottom record is moved off of said shelf.

12. The combination of claim 7, wherein said outwardly extending lip portion is arcuately shaped to conform generally to the central aperture of a 45 rpm record.

13. The combination of claim 1, wherein said shelf is undercut at an angle of approximately 50° to the horizontal.

14. The combination of claim 1, which includes a socket positioned at the center of said turntable, and said adapter body includes an integral depending stem portion adapted to be positioned in said socket in place of a centering spindle for small hole records.

15. The combination of claim 14, wherein said ejector means includes a blade pivotally mounted in said stem portion for movement about a horizontal axis and extending upwardly within said body to the level of said shelf.

16. The combination of claim 15, wherein said record ejector means also includes a member slidably mounted in said adaptor body for movement in a horizontal plane and interconnected with the upper end of said blade, the outer end of said member being positioned to engage the bottom record of a stack of 45 rpm records seated on said shelf.

17. The combination of claim 16, wherein the upper end of said blade extends through an opening in said slidably mounted member so that pivotal movement of said blade produces horizontal movement of said member.

18. In a record changer, the combination of, a record ejecting spindle including a vertically extending body portion and having a movable record ejector member for releasing the bottom record of a stack of small hole records positioned on said spindle to travel into playing position on the turntable, a spindle adaptor body adapted to be placed in an operative position on said record ejecting spindle, means integral with said adaptor body defining a fixed supporting shelf for a stack of large hole 45 rpm records, means integral with said adaptor body and opposite said shelf defining a shoulder having an upwardly and inwardly inclined portion, said shoulder being positioned relative to said shelf so that one side of a stack of 45 rpm records is supported on said shelf and the other side of the stack is supported on said shoulder, a member mounted in said adaptor body, and means for holding said member into engagement with said record ejector member when said adaptor is in operative position on said spindle, said member having an outer end which engages the bottom record of a stack of 45 rpm records seated on said shelf and moves the bottom record off said shelf while the other side of the bottom record moves upwardly along said inclined portion of said shoulder to a point at which the distance to the outer edge of said shelf is less than the hole diameter of a 45 rpm record, during a record changing cycle, said shelf being shaped to permit movement of the bottom record off of said shoulder after the bottom record has been moved off of said shelf.

19. The combination of claim 18, wherein said shoulder extends at an angle of approximatley 30° to the vertical.

20. The combination of claim 18, wherein the distance from the inner edge of said shelf to the bottom of said shoulder is slightly greater than the hole diameter of a 45 rpm record, and said shelf is under cut to a point at which the distance to the bottom of said shoulder is less than the hole diameter of a 45 rpm record.

21. The combination of claim 20, which includes means on the outer end of said member defining an upper edge adapted to be inserted between the bottom record and the next record in the stack as the bottom record is moved off of said shelf, said member and said shoulder providing a support for the records remaining in the stack as the bottom record is moved off of said shelf.

22. The combination of claim 21, wherein said member is moved inwardly as said record ejector member is returned to its initial position so that support for said one side of the remaining record stack is transferred from said upper edge to said shelf, said shoulder acting to move the record stack laterally during such transfer so that the bottom record thereof is precisely positioned against said inner edge of said shelf.

23. The combination of claim 18, wherein said outer end of said member is provided with a projecting thin lip portion formed in the upper edge of said outer end portion and adapted to be inserted between the bottom record and the next record in the stack as the bottom record is moved off of said shelf.

24. The combination of claim 23, wherein said lip portion is arcuately shaped to conform generally to the central aperture of a 45 rpm record.

* * * * *

UNITED STATES PATENT AND TRADEMARK OFFICE
CERTIFICATE OF CORRECTION

PATENT NO. : 4,559,623

DATED : December 17, 1985

INVENTOR(S) : James T. Dennis

It is certified that error appears in the above-identified patent and that said Letters Patent are hereby corrected as shown below:

Col. 10, line 59, "7" should read --11--;

line 68, "adapter" should read --adaptor--;

line 8, change "approximatley" to

--approximately--.

Signed and Sealed this

Fourth Day of November, 1986

[SEAL]

Attest:

Attesting Officer

DONALD J. QUIGG

Commissioner of Patents and Trademarks